United States Patent
Shih (10) Patent No.: US 9,071,591 B2
(45) Date of Patent: Jun. 30, 2015

(54) AUTHENTICATION METHOD FOR NETWORK CONNECTION AND NETWORK DEVICE AND NETWORK AUTHENTICATION SYSTEM USING THE SAME METHOD

(75) Inventor: Neng-Chieh Shih, New Taipei (TW)

(73) Assignee: Wistron Corp., New Taipei (TW)

( * ) Notice: Subject to any disclaimer, the term of this patent is extended or adjusted under 35 U.S.C. 154(b) by 116 days.

(21) Appl. No.: 13/458,939

(22) Filed: Apr. 27, 2012

(65) Prior Publication Data

US 2012/0297448 A1 Nov. 22, 2012

(30) Foreign Application Priority Data

May 20, 2011 (TW) .............................. 100117714 A (51) Int. Cl.
*G06F 7/04* (2006.01)
*H04L 9/32* (2006.01)
*G06F 21/00* (2013.01)
*H04L 29/06* (2006.01)
*G06F 21/31* (2013.01)

(52) U.S. Cl.
CPC ............... *H04L 63/08* (2013.01); *H04L 63/083* (2013.01); *G06F 21/31* (2013.01)

(58) Field of Classification Search
CPC ........ H04L 63/08; H04L 63/083; G06F 21/31
USPC .............. 726/3, 4, 5; 713/168, 182
See application file for complete search history.

(56) References Cited

U.S. PATENT DOCUMENTS

| 2007/0156592 | A1* | 7/2007 | Henderson ....................... 705/51 |
| 2010/0268694 | A1* | 10/2010 | Denoue et al. ................. 707/693 |
| 2011/0040867 | A1* | 2/2011 | Kalbag .......................... 709/224 |
| 2011/0088078 | A1* | 4/2011 | Kholaif et al. ..................... 726/3 |
| 2011/0302571 | A1* | 12/2011 | O'Farrell et al. .............. 717/170 |
| 2012/0109826 | A1* | 5/2012 | Kobres ............................ 705/64 |
| 2012/0278185 | A1* | 11/2012 | Ramachandran et al. . 705/14.73 |
| 2012/0282921 | A1* | 11/2012 | Motola et al. .............. 455/426.1 |

FOREIGN PATENT DOCUMENTS

TW I254550 5/2006

OTHER PUBLICATIONS

Taiwan Patent Office, Office Action, Patent Application Serial No. 100117714, Nov. 11, 2013, Taiwan.
Taiwan Patent Office, Office Action, Patent Application Serial No. 100117714, Jun. 24, 2014, Taiwan.
China Patent Office, Office Action, Patent Application Serial No. 201110148350.9, Jul. 3, 2014, China.

* cited by examiner

*Primary Examiner* — Aravind Moorthy (57) ABSTRACT

An authentication method for a network connection for a network device is provided. An embedded system is installed in the network connection, and the network device is free from a web browser. First, the network device connects to an authentication server, and an internet access request is sent to the authentication server. An authentication page is retrieved from the authentication server. User authentication data is obtained by an input unit of the network device, and then the user authentication data is filled in corresponding fields of the authentication page. The authentication page is transferred to the authentication server. After, when authentication of the authentication page is successful, the network device connects to the Internet via the authentication server.

21 Claims, 5 Drawing Sheets

AUTHENTICATION METHOD FOR NETWORK CONNECTION AND NETWORK DEVICE AND NETWORK AUTHENTICATION SYSTEM USING THE SAME METHOD

CROSS REFERENCE TO RELATED APPLICATIONS

This application claims priority of Taiwan Patent Application No. 100117714, filed on May 20, 2011, the entirety of which is incorporated by reference herein.

FIELD OF THE INVENTION

The invention relates to a network device with an embedded system, and more particularly to an authentication method for network connection of a network device with an embedded system to connect the network device to the Internet through hyper text transfer protocol (HTTP) connection authentication when there is no web browser provided by the network device.

DESCRIPTION OF THE RELATED ART

Many public places which provide internet access services, such as coffee shops, fast food restaurants, airports, train stations, hotels etc., may establish a wireless access point, so that users can connect to an open network (public network). However, for network safety considerations, when a user desires to browse the Internet via a public network, a network device of the user is generally required to be authenticated by an authentication server of the wireless access point, before it is connected to the Internet.

Figure 1:
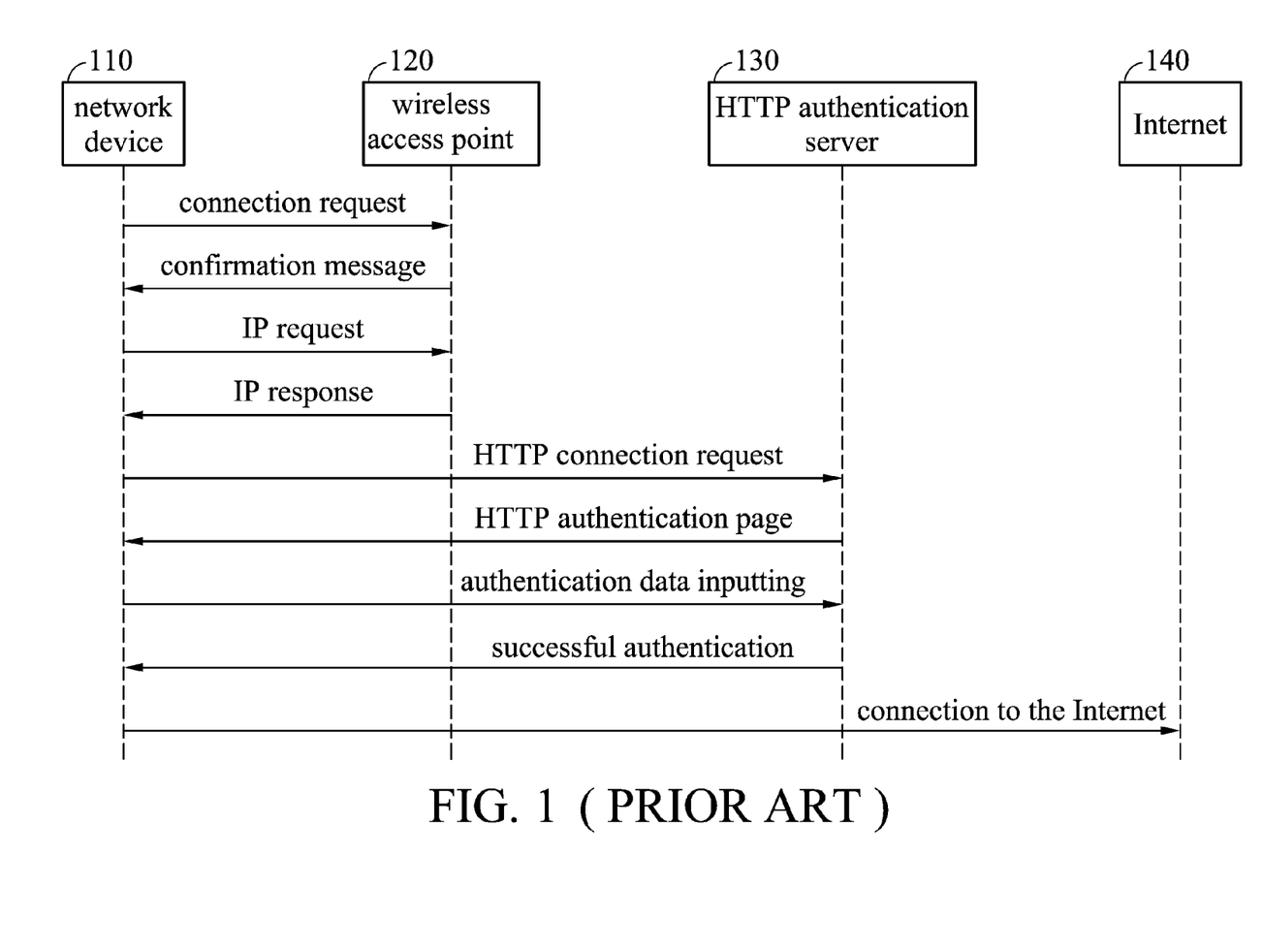
FIG. 1 is a schematic view showing an authentication flow of a network device connecting to the Internet.

FIG. 1 is a schematic view showing an authentication flow of a network device connecting to the Internet, wherein the network device has a web browser for viewing pages of the Internet.

A network device 110 sends a connection request to a wireless access point 120. After the wireless access point 120 receives the connection request, the wireless access point 120 sends a confirmation message to the network device 110. The network device 110 then sends a request for obtaining an internet protocol (IP) address to the wireless access point 120, and the wireless access point 120 dynamically assigns an IP address to the network device 110.

When obtaining the IP address, the network device 110 sends an HTTP connection request to an HTTP authentication server 130. After receiving the HTTP connection request, the HTTP authentication server 130 transfers an authentication page to the network device 110. Accordingly, the user can view the authentication page displayed by the web browser and then input user authentication data (account and password) on the authentication page for an authentication procedure. When authentication is successful, the user can connect to the Internet 140 via the wireless access point 120, or, otherwise, the user may browse only a local area network provided by the wireless access point 120.

However, a network device where an embedded system is installed (such as an internet radio) provides only a small screen for displaying. The network device does not provide a web browser for users to view web pages and proceed with user authentication. The network device connects to an authentication server and obtains information only through an extensible markup language (XML) protocol or other specified protocol. Moreover, with authentication pages provided by different authentication servers, user authentication fields are also different, so that it is more difficult for a network device where an embedded system is installed to proceed with user authentication.

BRIEF SUMMARY OF THE INVENTION

An exemplary embodiment of an authentication method for a network connection for a network device is provided. An embedded system is installed in the network device, and the network device is free from a web browser. The authentication comprises the steps of: connecting the network device to an authentication server and sending an internet access request to the authentication server; retrieving an authentication page from the authentication server; obtaining user authentication data by an input unit of the network device; filling the user authentication data in corresponding fields of the authentication page; transferring the authentication page to the authentication server; and connecting the network device to the Internet via the authentication server when authentication of the authentication page is successful.

An exemplary embodiment of a network device is provided. An embedded system is installed in the network device, and the network device is free from a web browser. The network device comprises a storage unit, a connection unit, an input unit, and an authentication unit. The storage unit stores a plurality of authentication pages. The connection unit connects the network device to an authentication server and sends an internet access request to the authentication server. The input unit obtains authentication data. The authentication unit retrieves an authentication page from the authentication server, obtains the authentication data via the input unit, fills the authentication data in corresponding fields of the authentication page, and transfers the authentication page to the authentication server. When authentication of the authentication page is successful, the connection unit connects the network device to the Internet via the authentication server.

An exemplary embodiment of a network authentication system is provided. The network authentication system comprises an authentication server, the Internet; and a network device. An embedded system is installed is the network device, and the network device is free from a web browser. The network device connects to the authentication server, sends an internet access request to the authentication server, retrieves an authentication page from the authentication server, obtains authentication data, fills the authentication data in corresponding fields of the authentication page, transfers the authentication page to the authentication server, and connects to the Internet via the authentication server when authentication of the authentication page is successful.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
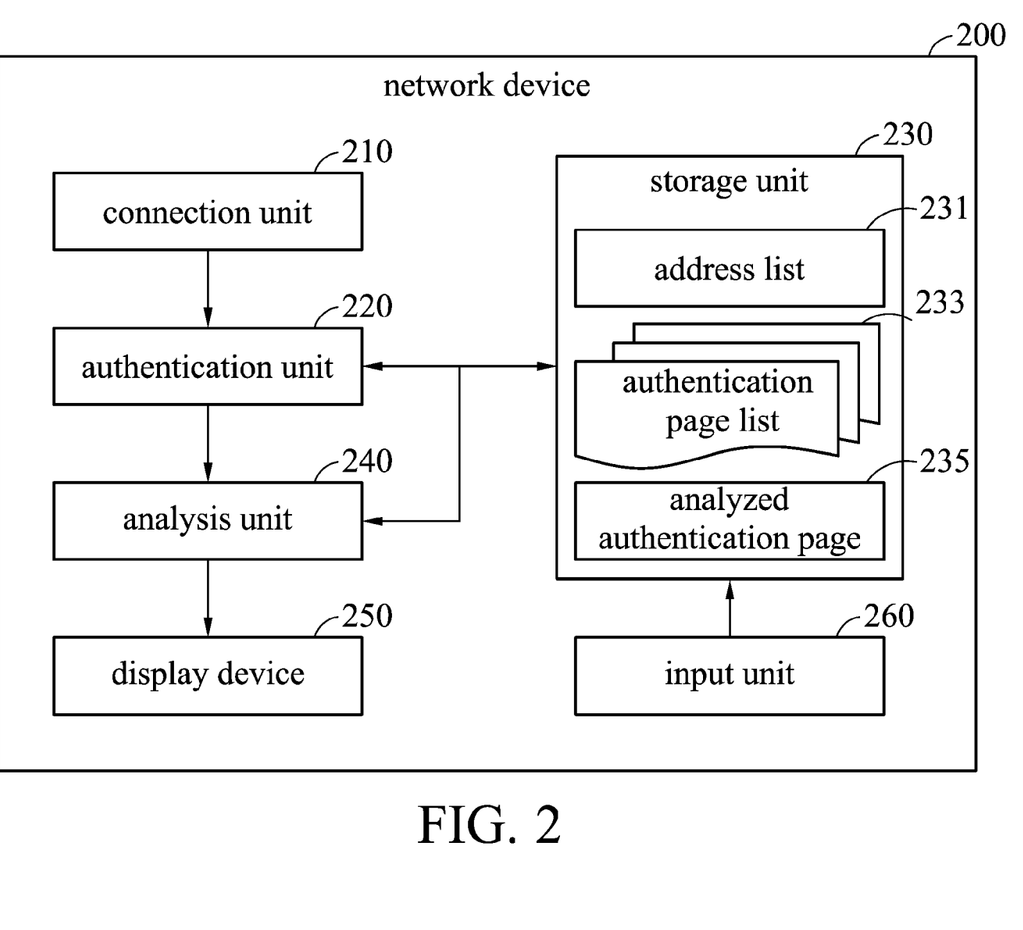
FIG. 2 shows an exemplary embodiment of a network device according to the present invention.

In an exemplary embodiment of a network device in FIG. 2, a network device 200 comprises a connection unit 210, an authentication unit 220, a storage unit 230, an analysis unit 240, a display device 250, and an input unit 260. The storage unit 230 further comprises an address list 231, an authentication page list 233, and an analyzed authentication page 235.

An embedded system is installed in the network device 200. Moreover, the network device 200 is free from a web browser which is provided for users to connect to the Internet and view web pages.

Figure 3:
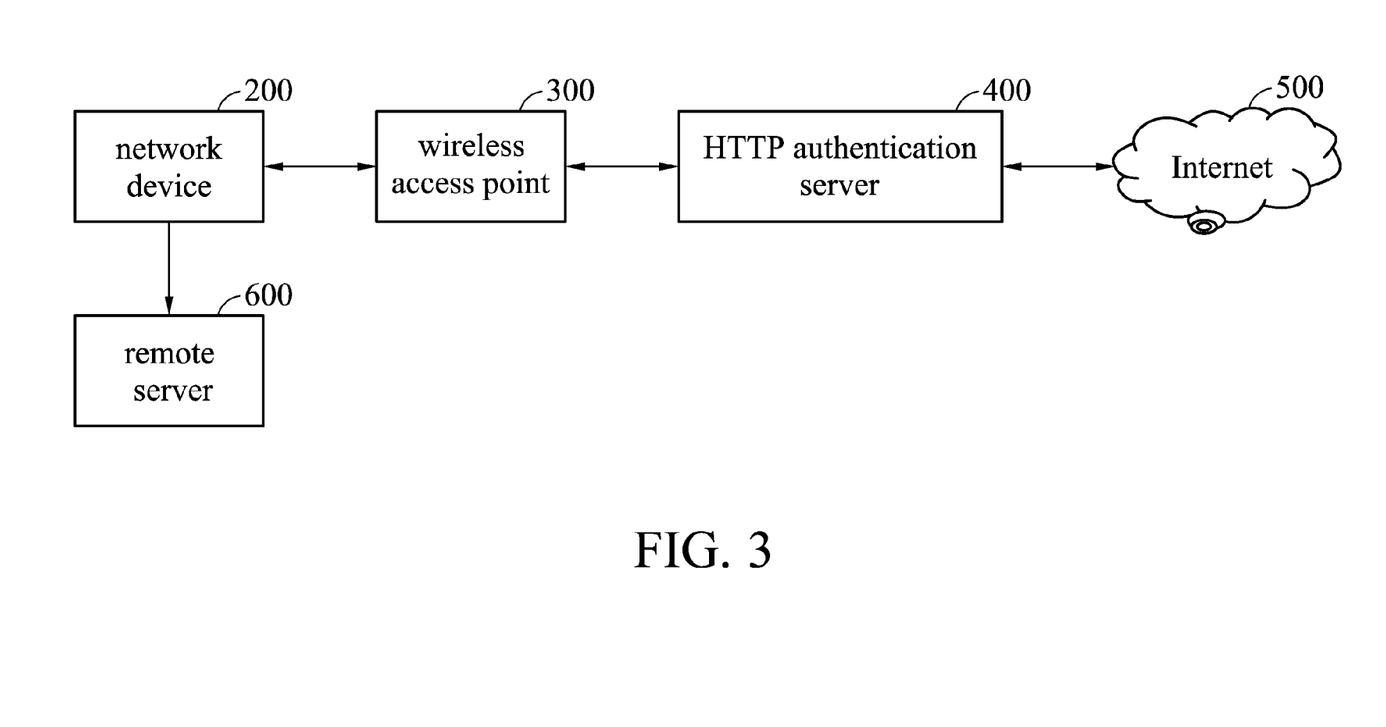
FIG. 3 shows an exemplary embodiment of a network authentication system according to the present invention.

FIG. 3 shows an exemplary embodiment of a network authentication system. The network authentication system comprises a network device 200, a wireless access point 300, an HTTP authentication server 400, the Internet 500, and a remote server 600.

In the embodiment, the network device 200 is a wireless network device. The remote server 600 is established by the supplier of the network device 200. The remote server 600 connects to the network device 200 by wired or wireless connection and processes data which is obtained from the network device 200.

Figure 4A:
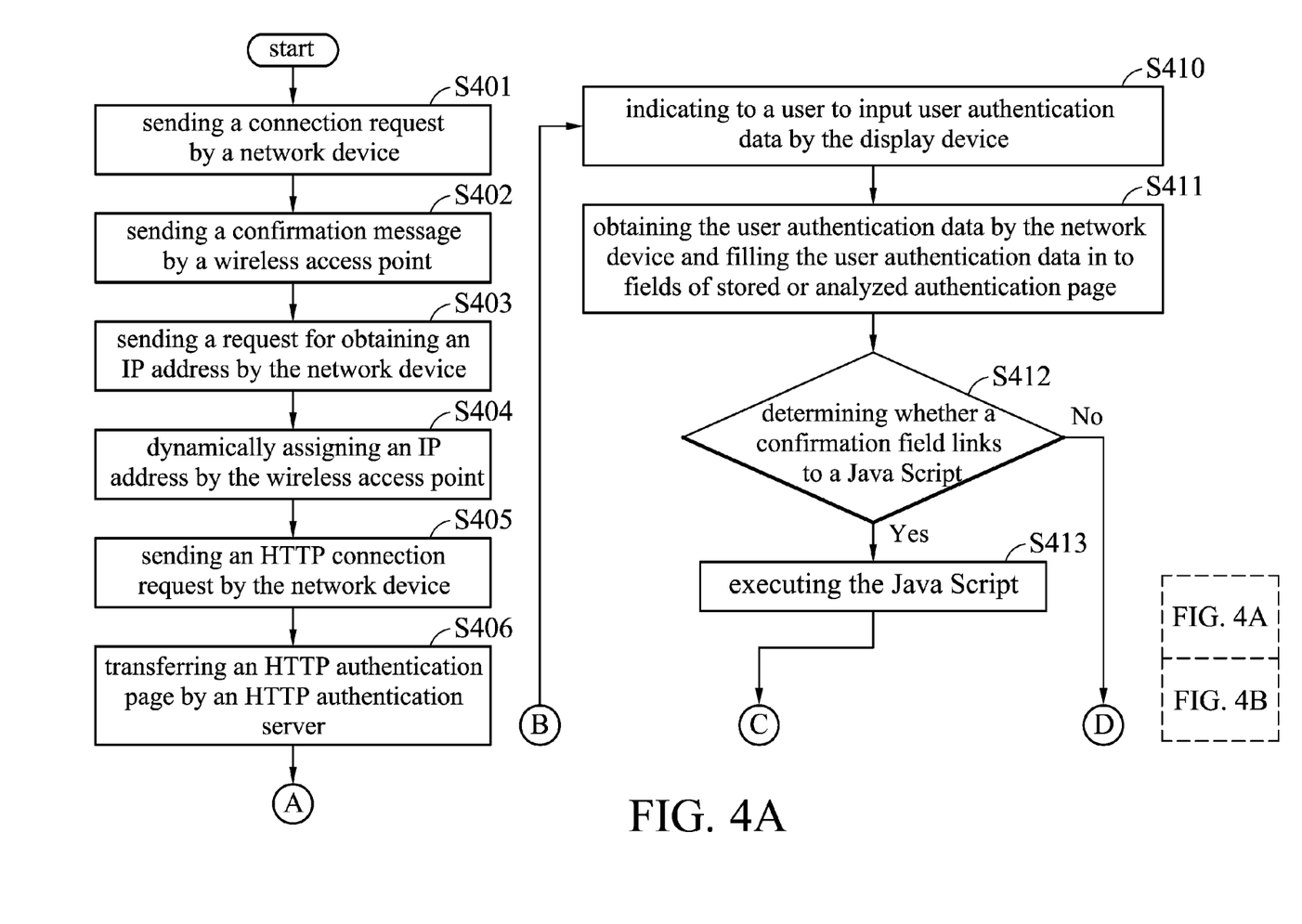
FIGS. 4A and 4B are flow charts of an exemplary embodiment of an authentication method for network connection according to the present invention.
Figure 4B:
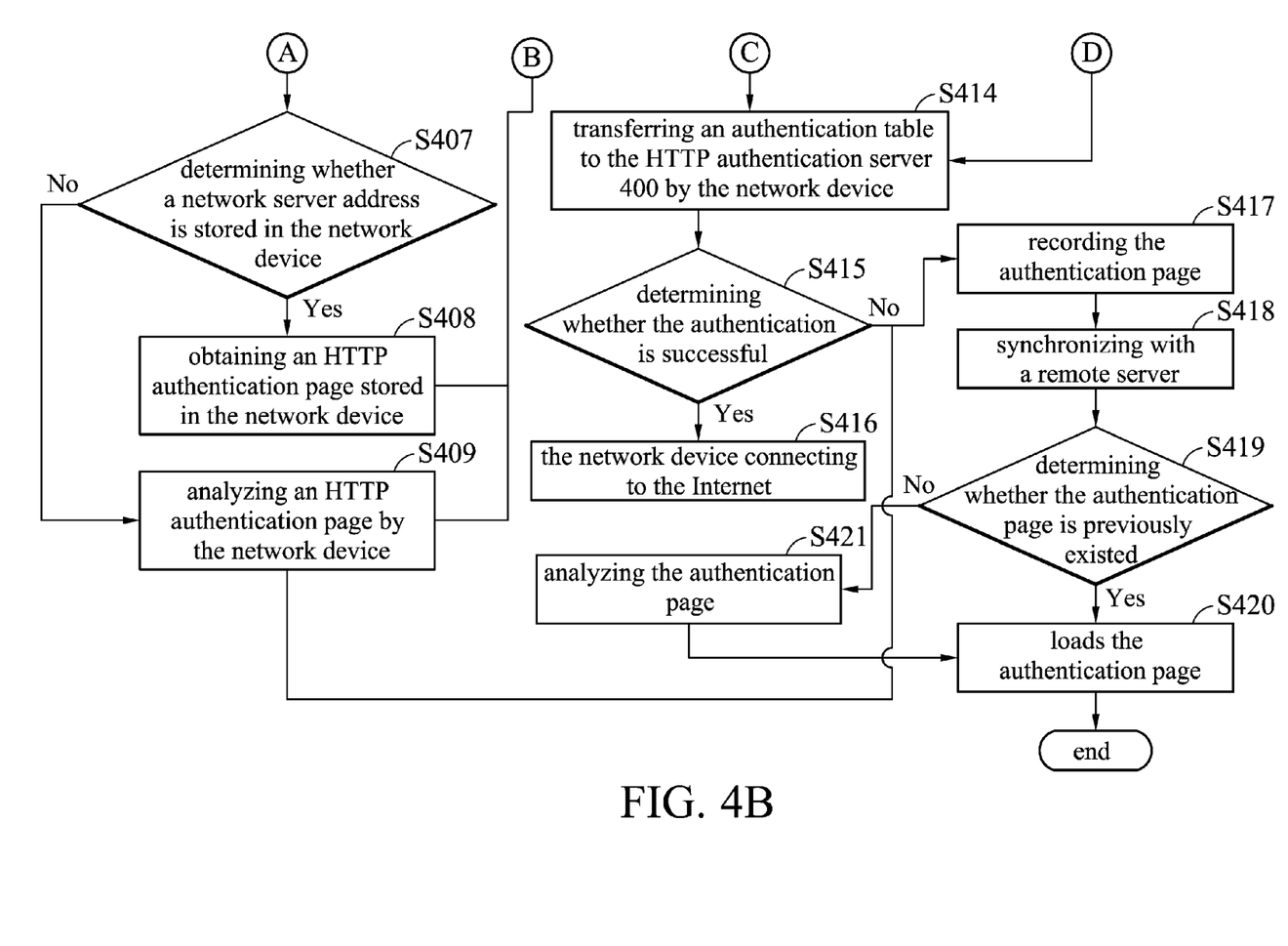

FIGS. 4A and 4B are flow charts of an exemplary embodiment of an authentication method for network connection.

First, when a user activates the network device 200, the connection unit 210 sends a connection request to the wireless access point 300 (step S401). After the wireless access point 300 receives the connection request, the wireless access point 300 sends a confirmation message to the network device 200 (step S402). The connection unit 210 then sends a request for obtaining an internet protocol (IP) address to the wireless access point 300 (step S403). After receiving the request for obtaining an IP address, the wireless access point 300 dynamically assigns an IP address to the network device 200 (step S404).

After the network device 200 obtains the IP address from the wireless access point 300, the network device 200 has a connection function, but the network device 200 does not have the capability of performing internet access. At this time, if the user proceeds to login to a specific website (expected web page), such as Google.com, the network device 200 will retrieve an unexpected web page, that is an authentication page of the HTTP authentication server 400.

In other words, the connection unit 210 of the network device 200 sends an HTTP connection request to the HTTP authentication server 400 (step S405). After the HTTP authentication server 400 receives the HTTP connection request, the HTTP authentication server 400 transfers an HTTP authentication page to the network device 200 (step S406).

Note that the HTTP authentication page described in the embodiment may be a hypertext markup language (HTML) page or a table conforming to the HTML form, which comprises a plurality of user authentication fields.

The authentication unit 220 of the network device 200 accesses a network server address of the HTTP authentication page and determines whether the network server address is stored in the address list 231 of the storage unit 230 (step S407). If the network server address is stored in the address list 231 of the storage unit 230, it is recognized that the HTTP authentication page has been analyzed previously and stored in the authentication page list 233 or that the HTTP authentication page is a built-in authentication page stored in the authentication page list 233. Thus, the network device 200 automatically obtains the HTTP authentication page (step S408). The display device 250 of the network device 200 shows an input message to indicate to the user to input user authentication data (such as account or password) (step S410).

If the network server address has not been previously stored in the address list 231 of the storage unit 230, the analysis unit 240 analyzes the HTTP authentication page (step S409). If the HTTP authentication page is analyzed successfully, an analyzed authentication page 235 is generated and stored in the storage unit 230. The display device 250 of the network device 200 shows an input message to indicate to the user to input user authentication data (such as account or password) (step S410).

The input unit 260 of the network device 200 obtains the user authentication data input by the user and fills the user authentication data in to corresponding fields of the stored authentication page or the analyzed authentication page 235 (step S411).

The following table shows information of several user authentication fields of the authentication page.

--- a. table form: the property thereof is post.
b. account: the field thereof is usually names as user, username, or login, and the property thereof is text.
c. password: the field thereof is usually names as pass, passwd, or password.
d. authentication information: the contents thereof may be different with different authentication page, the property thereof is hide, and the authentication information may be modified by Java Script or serve as data to be sent.
e. confirmation: the field thereof is usually names as Submit, and the field thereof may link to Java Script to perform content confirmation or may be enabled or directly send a authentication request.

---

The authentication unit 220 determines whether the confirmation field of the analyzed authentication page 235 or the stored authentication page links to a Java Script (step S412). Some authentication pages require performing other processes which are accomplished by Java Script after the user authentication data is obtained.

Thus, if the confirmation field links to a Java Script, after "Submit" is enabled, the Java Script is executed to perform the following processes (step S413). When the confirmation field does not link to a Java Script or after a Java Script is executed, the authentication unit 220 transfers the analyzed authentication page 235 to the HTTP authentication server 400 via the wireless access point 300 (step S414). Then, the authentication unit 220 determines whether the authentication is successful (step S415). When the authentication is successful, the network device 200 connects to the Internet 500 (step S416).

Since a network device where an embedded system is installed does not have complete capability of processing HTTP data, that is the network device may not execute Java Script or other high-level programming language, the analysis unit 240 may fail to analyze the HTTP authentication page. Thus, when the analysis unit 240 fails to analyze the HTTP authentication page in the step S409 or when the authentication unit 220 determines that the authentication of the authentication page is not successful in the step S415, the authentication unit 220 records the corresponding authentication page in the storage unit 230 (step S417). When the network device 200 successfully connects to the Internet later, the network device 200 is synchronized with the remote server 600. Then, the authentication unit 220 uploads the authentication page which is recorded when the analysis operation to the HTTP authentication page fails or when the authentication of the authentication page is not successful (step S418).

At this time, the remote server 600 determines whether the uploaded authentication page is an authentication page which previously existed in the remote server 600 (step S419). If the uploaded authentication page is an authentication page which previously existed in the remote server 600, the authentication unit 220 of the network device 200 loads the authentication page which previously existed in the remote server 600 from the remote server 600 (step S420). If the uploaded authentication page is not an authentication page which previously existed in the remote server 600, the remote server 600 analyzes the uploaded authentication page (step S421). When the network device 200 successfully connects to the Internet next time, the authentication unit 220 loads the analyzed authentication page from the remote server 600 (step S420).

In another embodiment, the network device 200 is a wired network device. In this case, the network device 200 directly connects to the HTTP authentication server 400 via a wired network not via the wireless access point 300. In the flow chart of FIGS. 4A and 4B, the steps S401-S405 are modified. According to the modified steps, the network device 200 sends a connection request and a request for obtaining an IP address directly to the HTTP authentication server 400. After receiving an IP address, the network device 200 directly sends an internet access request to the HTTP authentication server 400. The other steps S406-S420 are not modified. The authentication method for a network connection in the above embodiment may solve the problems induced when no web browser is provided for inputting of user authentication data, so that a network device where an embedded system is installed may perform authentication on web pages.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An authentication method for a network connection for a network device where an embedded system is installed therein, comprising:
   connecting the network device to an authentication server and sending an internet access request to the authentication server;
   retrieving an authentication page from the authentication server;
   indicating to a user of the network device to input user authentication data;
   obtaining the user authentication data by an input unit of the network device;
   filling the user authentication data in corresponding fields of the authentication page;
   transferring the authentication page to the authentication server; and
   connecting the network device to the Internet via the authentication server when authentication of the authentication page is successful;
   wherein the network device is free from a web browser; and
   wherein the network device does not have complete capability of processing web-based format data.

2. The authentication method as claimed in claim 1, wherein when the network device is a wireless network device, the authentication method further comprises:
   connecting the network device to a wireless access point and obtaining a network address; and
   sending the internet access request to the authentication server via the wireless access point.

3. The authentication method as claimed in claim 1, wherein the step of retrieving the authentication page from the authentication server comprises:
   determining whether the authentication page has been previously stored in the network device; and
   if the authentication page has not been previously stored in the network device, performing an analysis operation to the authentication page.

4. The authentication method as claimed in claim 3, wherein the step of retrieving the authentication page from the authentication server comprises, if the authentication page has been previously stored in the network device, automatically obtaining the authentication page.

5. The authentication method as claimed in claim 3 further comprising:
   when the authentication of the authentication page is not successful or when the analysis operation fails, recording the authentication page;
   uploading the recorded authentication page to a remote server when the network device successfully connects to the Internet later;
   determining whether the uploaded authentication page is an authentication page which previously existed in the remote server;
   if the uploaded authentication page is an authentication page which previously existed in the remote server, loading the authentication page which previously existed in the remote server from the remote server; and
   if the uploaded authentication page is not an authentication page which previously existed in the remote server, analyzing the uploaded authentication page, and when the network device successfully connects to the Internet later, loading the analyzed authentication page from the remote server.

6. The authentication method as claimed in claim 1, wherein the authentication is a table conforming to a hypertext markup language (HTML) form, and the table comprises a plurality of user authentication fields, and the authentication method further comprises:
   filling the user authentication data in the user authentication fields of the authentication page.

7. The authentication method as claimed in claim 1, wherein the step of filling the user authentication data in the corresponding fields of the authentication page comprises:
   determining whether a confirmation field of the authentication page links to Java Script;
   if the confirmation field links to the Java Script, executing the Java Script and transferring the authentication page to the authentication server; and
   if the confirmation field does not link to the Java Script, transferring the authentication page to the authentication server.

8. A network device where an embedded system is installed therein, comprising:
   a storage unit configured to store a plurality of authentication pages;
   a connection unit configured to connect the network device to an authentication server and send an internet access request to the authentication server;

an input unit configured to obtain authentication data when a user of the network device is indicated to input the authentication data; and an authentication unit configured to retrieve an authentication page from the authentication server, obtain the authentication data via the input unit, fill the authentication data in corresponding fields of the authentication page, and transfer the authentication page to the authentication server;

wherein when authentication of the authentication page is successful, the connection unit is configured to connect the network device to the Internet via the authentication server;

wherein the network device is free from a web browser; and wherein the network device does not have complete capability of processing web-based format data.

9. The network device as claimed in claim 8, wherein when the network device is a wireless network device, the wireless network device is configured to connect to a wireless access point, obtain a network address, and send the internet access request to the authentication server via the wireless access point.

10. The network device as claimed in claim 8 further comprising an analysis unit, wherein the authentication page is configured to determine whether the authentication page has been previously stored in the network device, and if the authentication page has not been previously stored in the network device, the analysis unit is configured to perform an analysis operation to the authentication page.

11. The network device as claimed in claim 10, wherein if the authentication page has been previously stored in the network device, the authentication unit is configured to automatically obtain the authentication page.

12. The network device as claimed in claim 10,
wherein when the authentication of the authentication page is not successful or when the analysis operation fails, the authentication unit is configured to record the authentication page in the storage unit;

wherein when the network device successfully connects to the Internet later, the authentication unit is configured to upload the recorded authentication page to a remote server;

wherein the remote server is configured to determine whether the uploaded authentication page is an authentication page which previously existed in the remote server;

wherein if the uploaded authentication page is an authentication page which previously existed in the remote server, the authentication unit is configured to load the authentication page which previously existed in the remote server from the remote server; and wherein if the uploaded authentication page is not an authentication page which previously existed in the remote server, the remote server is configured to analyze the uploaded authentication page, and when the network device successfully connects to the Internet later, the authentication unit is configured to upload the analyzed authentication page from the remote server.

13. The network device as claimed in claim 8, wherein the authentication is a table conforming to a hypertext markup language (HTML) form, the table comprises a plurality of user authentication fields, and the authentication unit is configured to fill the user authentication data in the user authentication fields of the authentication page.

14. The network device as claimed in claim 8,
wherein the authentication unit is configured to determine whether a confirmation field of the authentication page links to Java Script;

wherein if the confirmation field links to the Java Script, the Java Script is executed, and the authentication page is transferred to the authentication server; and if the confirmation field does not link to the Java Script, the authentication page is transferred to the authentication server.

15. A network authentication system comprising:
an authentication server;
the Internet; and
a network device where an embedded system is installed and which is free from a web browser;

wherein the network device is configured to connect to the authentication server, send an internet access request to the authentication server, retrieve an authentication page from the authentication server, indicate a user of the network device to input authentication data, obtain the authentication data through an input unit of the network device, fill the authentication data in corresponding fields of the authentication page, transfer the authentication page to the authentication server, and connect to the Internet via the authentication server when authentication of the authentication page is successful browser; and wherein the network device does not have complete capability of processing web-based format data.

16. The network authentication system as claimed in claim 15 further comprising a wireless access point, wherein the wireless network device is configured to connect to the wireless access point, obtain a network address, and send the internet access request to the authentication server via the wireless access point.

17. The network authentication system as claimed in claim 15, wherein the network device is configured to determine whether the authentication page has been previously stored in the network device, and if the authentication page has not been previously stored in the network device, the network device is configured to perform an analysis operation to the authentication page.

18. The network authentication system as claimed in claim 17, wherein if the authentication page has been previously stored in the network device, the network device is configured to automatically obtain the authentication page.

19. The network authentication system as claimed in claim 17 further comprising a remote server,
wherein when the authentication of the authentication page is not successful or when the analysis operation fails, the network device is configured to record the authentication page and upload the recorded authentication page to a remote server;

wherein the remote server is configured to determine whether the uploaded authentication page is an authentication page which previously existed in the remote server;

wherein if the uploaded authentication page is an authentication page which previously existed in the remote server, the network device is configured to load the authentication page which previously existed in the remote server from the remote server; and wherein if the uploaded authentication page is not an authentication page which previously existed in the remote server, the remote server is configured to analyze the uploaded authentication page, and when the network device successfully connects to the Internet later, the network device is configured to load the analyzed authentication page from the remote server.

20. The network authentication system as claimed in claim 15, wherein the authentication is a table conforming to a hypertext markup language (HTML) form, the table comprises a plurality of user authentication fields, and the network device is configured to fill the user authentication data in the user authentication fields of the authentication page.

21. The network authentication system as claimed in claim 15,
- wherein the network device is configured to determine whether a confirmation field of the authentication page links to Java Script;
- wherein if the confirmation field links to the Java Script, the Java Script is executed, and the authentication page is transferred to the authentication server; and
- wherein if the confirmation field does not link to the Java Script, the authentication page is transferred to the authentication server.

* * * * *